July 13, 1954
C. W. KELSEY
2,683,406
TINE HOLDER ASSEMBLY
Filed May 13, 1949
2 Sheets-Sheet 2
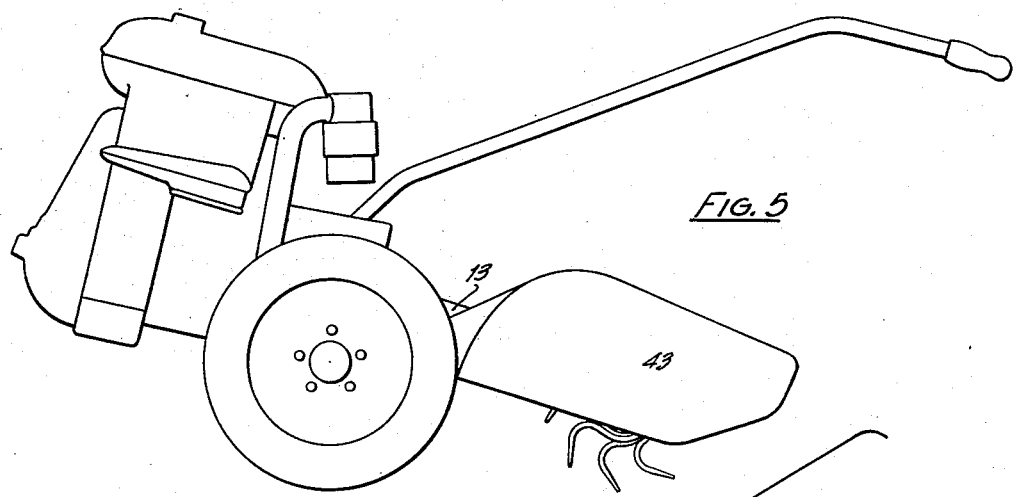
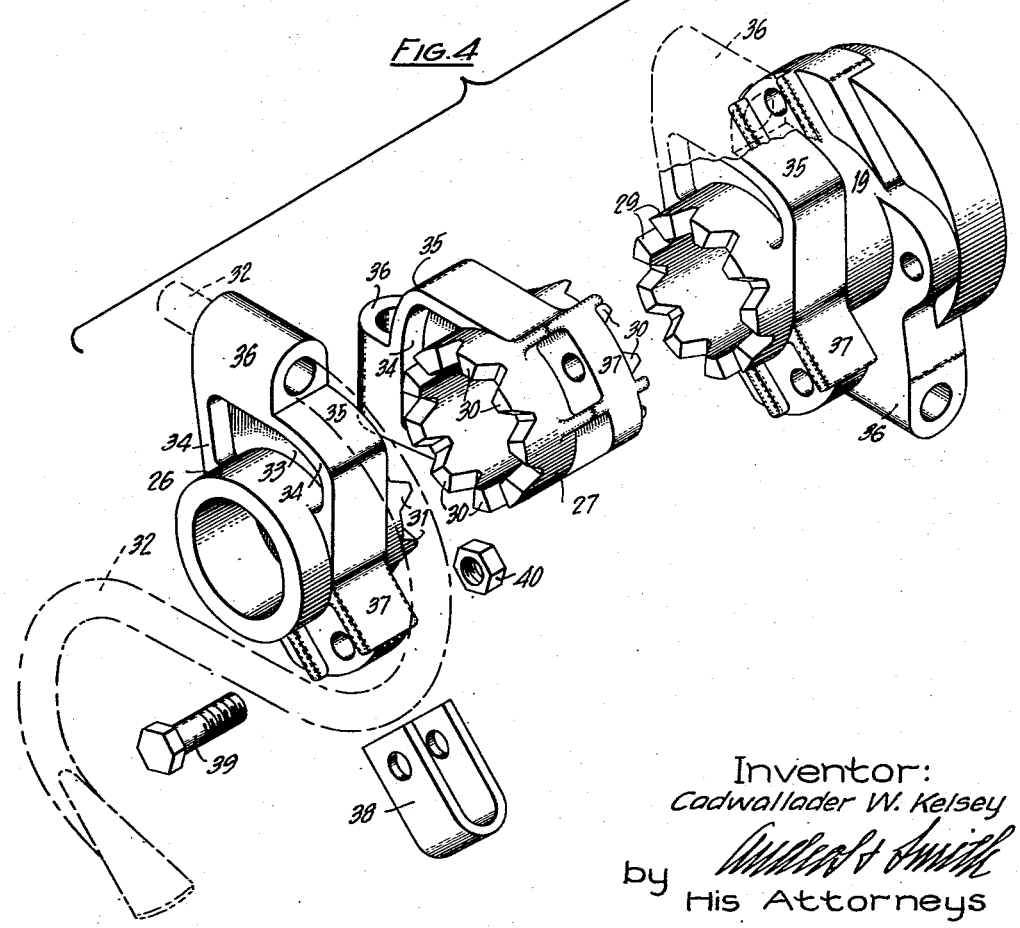
Inventor:
Cadwallader W. Kelsey
by *Hubert H. Smith*
His Attorneys Patented July 13, 1954

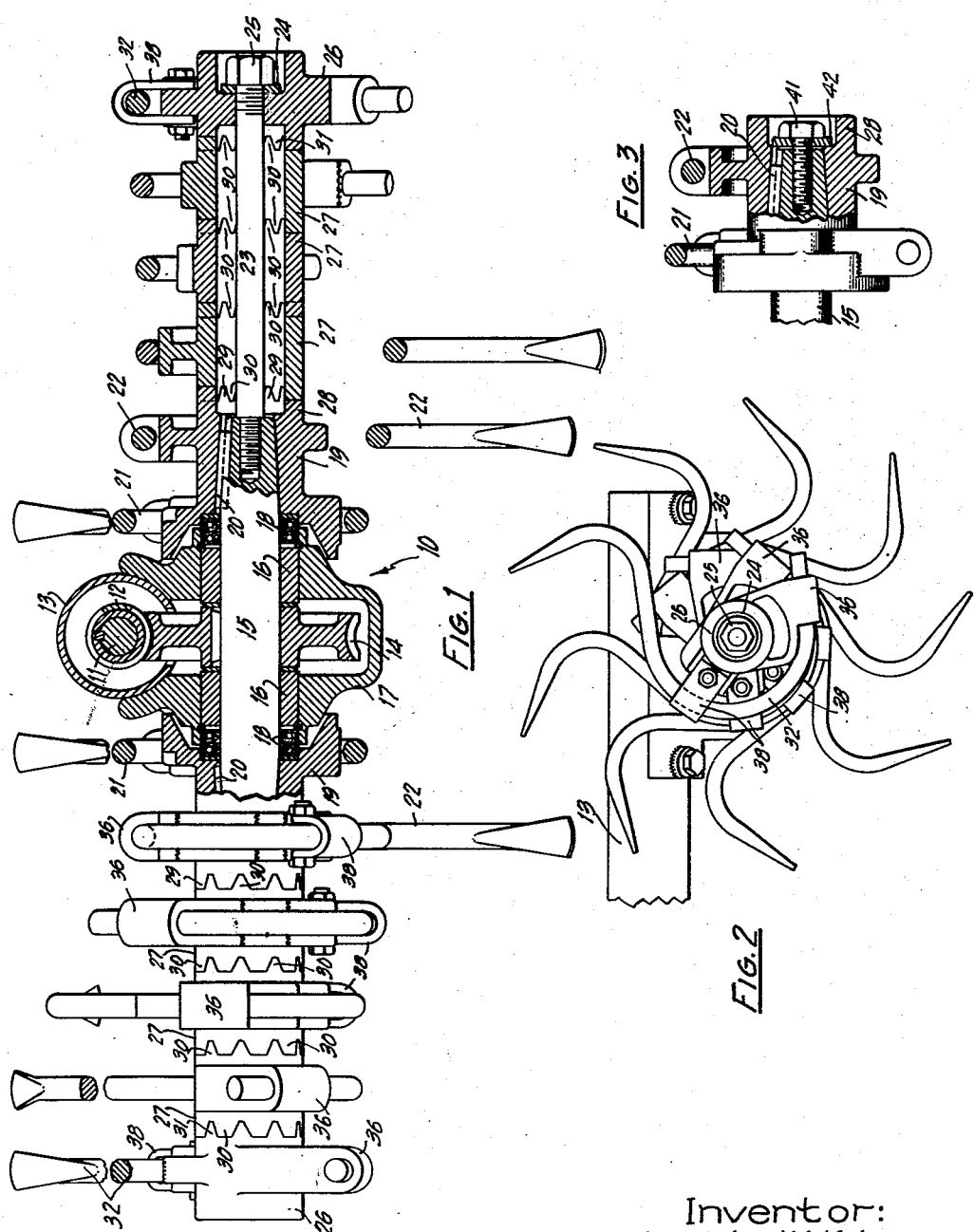

2,683,406

UNITED STATES PATENT OFFICE 2,683,406

TINE HOLDER ASSEMBLY

Cadwallader W. Kelsey, Troy, N. Y.

Application May 13, 1949, Serial No. 93,109

7 Claims. (Cl. 97—216)

This invention relates to rotary soil working machines. More particularly, it pertains to an improved type of rotary soil working tine holder assembly for such machines.

Tine holders carrying a plurality of tines are sometimes made in a single section and keyed to a drive shaft. Other tine holders carrying one or more tines, are made in separate sections which are individually keyed to a drive shaft in abutting relation to build up a complete tine holder assembly. When the tines on either of the foregoing types of holders become bent, twisted or broken, it is often difficult to readily remove them from their keyed position on the shaft and replace them. Nor can the holders be rotated with respect to each other through a plurality of selected operating positions because of such keyed arrangements.

It is an object of the present invention to provide a tine holder assembly in which the several tine holders readily can be assembled and replaced when necessary by eliminating the necessity for having the entire tine holder assembly keyed to the drive shaft.

Another object of the invention is to provide a tine holder assembly in which the several holders interfittingly engage each other and can be adjusted to a variety of selected positions.

Another object of the invention is to provide a tine holder assembly in which all of the individual tine holders interlockingly engage each other and extend from the drive shaft in coaxial alignment.

Another object of the invention is to provide a tine holder assembly in which the several holders are interlockingly secured to each other in such a manner that it is a relatively simple matter to adjust them selectively in order that the tines can be disposed in a variety of chosen positions without completely dismantling the assembly.

Another object of the invention is to provide a tine holder assembly in which only an inner driving tine holder is secured on the end of a drive shaft and the remaining tine holders are arranged coaxially to engage each other and be held in this position against the inner holder by holding means passing therethrough, but in spaced relation therefrom, said means being connected to the drive shaft.

Other objects of the invention will in part be obvious and will in part appear hereinafter.

The invention accordingly comprises the features of construction, combination of elements and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is an elevational view of a tine holder assembly embodied by the invention, partly in section and with parts broken away;

Fig. 2 is an end elevational view of a plurality of tine holders and tines mounted in selected position;

Fig. 3 is a detail view, partly in section and with parts broken away, of an inside tine holder only, secured to a drive shaft for special purpose use;

Fig. 4 is an exploded isometric view of one end portion of a tine holder assembly illustrating an inner tine holder, an outer tine holder and an intermediate tine holder; and Fig. 5 is a side view of a rotary soil working machine with a tine holder assembly embodying the invention.

Referring more particularly to the drawings, there is indicated generally at 10 a rotary tine holder assembly in which a driving shaft 11 is keyed to a worm 12 within a tubular housing or chassis 13. A worm wheel 14 meshes with the worm 12 through an opening provided therefor in the tubular housing 13. The worm wheel is keyed to a short drive shaft 15 which is tapered at both ends. The shaft 15 is journaled in bearings 16 in a housing 17 encasing the worm wheel 14. Oil seals 18 are mounted in the housing 17 adjacent the bearings 16. The tapered portions of the drive shaft 15 extend through the oil seals.

Mounted on each end of the tapered shaft 15 is an inner driving tine holder 19. Each driving holder is secured to the tapered shaft 15 by a key 20. Preferably, each driving holder carries two tines, 21 and 22, in mountings which are more fully described hereinafter.

Connected to and extending axially from the end of the drive shaft 15, as shown to the right of Fig. 1 of the drawings, is an elongated bolt 23 which preferably is threaded into the end of the drive shaft. This bolt, at its opposite end, carries a washer 24 and a nut 25.

Held on the end of the bolt 23, by the washer 24 and nut 25, is an outer tine holder 26 which has a central opening therethrough large enough to accommodate the shank of the bolt.

Between the inner driving tine holder 19 and the outer tine holder 26 are a plurality of other inner or intermediate tine holders 27 which are held in coaxial alignment therewith.

The intermediate and outer tine holders are not keyed to a drive shaft. Only the driving tine holder 19 is keyed to the tapered end of the shaft 15. The driving tine holder 19 has a hub portion 28 provided with a plurality of teeth or serrations 29 outwardly extending around its outer peripheral edge.

The intermediate tine holders 27 are likewise provided with teeth or serrations 30 around both of their peripheral edges. As illustrated in the drawings, a plurality of such tine holders can be mounted in coaxial alignment by meshing the teeth or serrations so that the holders extend along the shaft 23 and in spaced relation thereto. Any suitable number of such intermediate tine holders may be used depending upon the width of the soil cutting operation desired.

The outer tine holder 26 also has teeth or serrations 31 extending around its inner peripheral edge and these will mesh with the teeth or serrations on the adjacent intermediate tine holder, or with the teeth or serrations on the inner tine holder if desired.

It will be observed that the teeth on the various holders differ in size. For example, the intermediate holders have broader teeth with narrower spaces therebetween around one peripheral edge, and narrower teeth with broader spaces therebetween around the other peripheral edge. The adjacent teeth on adjacent intermediate holders are complementary to each other and the teeth on the inner driving holder and the outer holder are complementary to the teeth of their adjacent holders. The reason for this is to provide right and left holders for the right and left side of the assembly, although the invention is not limited to teeth, serrations or projections of different sizes.

The teeth or serrations preferably are tapered to produce a wedging action when adjacent members are coupled together. This wedging action provides a solid immovable joint that cannot be loosened by any shocks imparted by the tines.

The tines are of conventional S-type configuration as shown in dotted line position at 32 in Fig. 4. In that figure is shown an outside tine holder having a radially projecting web 33 with flanges 34 extending to either side thereof, and forming a supporting surface 35 for one portion of the tine. A socket 36, above the flange 34, receives the end of the tine 32.

A substantial distance around the holder from the socket 36 is an abutment 37 against which the curved portion of the tine is secured by a rebound clip 38 fastened to the abutment 37 by a bolt 39 and a nut 40. The means for holding the tines in position on all of the tine holders is the same as that just described. As illustrated, only a single tine appears on each holder. However, the inner driving holder is illustrated as having two tines and this permits working of the ground as closely as possible underneath the housing 17.

In the view shown in Fig. 2, as many as 9 tines are shown to illustrate the advantage of a tine holder assembly constructed in accordance with the present invention. Any desired number of tine holders can be used merely by substituting bolts 23 of different lengths. This is an advantage in that various length bolts can readily be supplied with each assembly. When a conventional drive shaft of fixed length is utilized to which the various tine holders are keyed, the number of holders which can be used is also fixed. With the present construction, where bolts of various lengths are provided, any desired number of holders can be utilized so that a wide range of cuts can be made with a machine equipped with such an assembly. Fig. 2 is illustrative merely and not necessarily an end view of what is shown, for example, in Fig. 1.

Because of the number of peripheral teeth or serrations on the holders, the tines can be turned to a plurality of different positions which is not possible when such holders are keyed to a conventional drive shaft.

Another advantage is that such an assembly allows for ready adjustment of the tines by merely backing the nut 25 from the bolt 23 a sufficient distance so that the teeth 29, 30 and 31 of adjacent tine holders will become disengaged, whereby the tine holders can be turned to their respective selected positions and the nut tightened to draw them interlockingly together without removing them from the bolt 23.

Replacement of holders is made simple by unscrewing the nut 25 entirely, removing one or more of the various tine holders and inserting new ones without concern regarding the use of keys to secure them properly in place on a shaft.

In Fig. 5, the relative position of the tine holder assembly with respect to the machine, is illustrated. The assembly is shown partly covered by a conventional type hood 43 to prevent the soil, as it is worked, from being thrown upwardly in the direction of the operator.

Fig. 3 illustrates the manner in which the inside tine holder 19 can be used by eliminating all of the other intermediate tine holders and the outside tine holder. In such instance, the long bolt 23 would be entirely eliminated and replaced by a short bolt 41, and washer 42, at the end of the tapered shaft 15. Such a construction is desirable, for example, where it is intended to work only a narrow portion of the ground. In this view no teeth or serrations are illustrated.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A rotary soil working tine holder assembly of the character described, comprising an inner tine holder having a tapered bore therein wedgingly to engage a tapered stub drive shaft of a rotary soil working machine, said holder having a hub portion with a plurality of blunt teeth projecting from around one of its peripheral edges, an integral radially projecting web intermediate the ends of said hub portion having openings therein adapted removably to secure thereto a soil working tine tangentially thereof, an adjacent floating tine holder having a hub portion with a similarly arranged plurality of blunt teeth directly and positively meshing with the teeth on said inner holder and operatively mounted thereon and rotatably carried by said inner holder only, in coaxial alignment therewith, an integral radially projecting web intermediate the ends of said hub portion on said floating tine holder having openings therein adapted removably to secure thereto a soil working tine tangentially thereof, and means passing through and rigidly securing said adjacent holder in meshed, floating position with said inner holder, and the latter to said drive shaft with all of said teeth in spaced relation with respect to said means, whereby said adjacent holder will be rotated by said inner holder.

2. A rotary soil working tine holder assembly of the character described, comprising an inner tine holder having a tapered bore therein wedgingly to engage a tapered stub drive shaft of a rotary soil working machine, said holder having a hub portion with a plurality of blunt teeth projecting from around its outer peripheral edge, an integral radially projecting web intermediate the ends of said hub portion having openings therein adapted removably to secure thereto a soil working tine tangentially thereof, an adjacent floating tine holder completely extending beyond the end of said shaft and having a hub portion with a plurality of complementary blunt teeth directly and positively meshing with the teeth on said inner holder, and operatively mounted thereon and rotatably carried by said first holder only, in coaxial alignment therewith, an integral radially projecting web intermediate the ends of said hub portion on said floating tine holder having openings therein adapted removably to secure thereto a soil working tine tangentially thereof, and a bolt extending through said adjacent holder and connected in axial alignment to the end of the drive shaft to secure said second holder in fixed floating position by said inner holder, and the latter to said drive shaft with all of said teeth in spaced relation with respect to said bolt whereby said adjacent holder will be rotated by said inner holder.

3. A rotary soil working tine holder assembly of the character described, wherein the tine holders are readily separable and rotatably adjustable to be meshed in any selected position with respect to each other, comprising an inner driving tine holder having a tapered bore therein wedgingly to engage a tapered stub drive shaft of a rotary soil working machine, said holder having a plurality of blunt projections substantially horizontally extending around its outer edge, an integral radially projecting web intermediate the ends of said hub portion having openings therein adapted removably to secure thereto a soil working tine tangentially thereof, an outer floating tine holder having a plurality of similarly arranged blunt projections around its inner edge, an integral radially projecting web intermediate the ends of said hub portion on said floating tine holder having openings therein adapted removably to secure thereto a soil working tine tangentially thereof, an intermediate floating tine holder for said inner and outer holders and having both of its peripheral edges provided with a plurality of spaces, an integral radially projecting web intermediate the ends of said hub portion on said intermediate tine holder having openings therein adapted removably to secure thereto a soil working tine tangentially thereof, said projections on said inner holder being adapted interfittingly to engage the adjacent spaces around one of the peripheral edges of said intermediate holder, and said projections on said outer holder being adapted interfittingly to engage the adjacent spaces around the other edge of said intermediate holder, both said outer and intermediate tine holders being directly and positively connected to each other, and the intermediate tine holder being directly and positively connected to said inner holder and rotatably carried by the outer and inner holders only, and holding means cooperatively connected with said drive shaft passing through said holders interlockingly to draw them together in fixed position with all of said teeth and said intermediate tine holder being out of engagement with and spaced laterally from said holding means.

4. A rotary soil working tine holder assembly of the character described, comprising an inner tine holder having a tapered bore therein for use wedgingly engaging the end of a tapered stub drive shaft of a rotary soil working machine, said inner tine holder having a plurality of blunt projections substantally horizontally extending therefrom around its outer peripheral edge, an integral radially projecting web intermediate the ends of said hub portion having openings therein adapted removably to secure thereto a soil working tine tangentially thereof, a second floating tine holder having a similarly arranged plurality of blunt projections around both of its peripheral edges, an integral radially projecting web intermediate the ends of said hub portion on said floating tine holder having openings therein adapted removably to secure thereto a soil working tine tangentially thereof, the projections of said second holder around one of the edges interfitting the space between said projections on said inner holder so that the second holder is carried by the first holder only, an outer tine holder having a plurality of blunt projections around its peripheral edge interfitting spaces between the projections around the other edge of said second holder so that said outer holder is carried by said second holder only, an integral radially projecting web intermediate the ends of said hub portion on said outer tine holder having openings therein adapted removably to secure thereto a soil working tine tangentially thereof, all of said holders being held in interlocked position by a member passing through said holders and connected to said shaft, which member is in spaced relation with respect to all projections and said floating holder.

5. An inner tine holder for a rotary soil working tine holder assembly, adapted for mounting upon a tapered stub drive shaft of a rotary soil working machine, comprising a hub having a tapered bore therein adapted cooperatively to be connected to the end of said drive shaft, an integral radially projecting web intermediate the ends of said hub portion having openings therein adapted removably to secure thereto a soil working tine tangentially thereof, a plurality of blunt projections extending substantially horizontally around one peripheral edge of said hub, which projections are adapted to engage spaces in the peripheral edge of an adjacent floating tine holder for said assembly interlockingly to secure said holders in fixed position, whereby to cause rotation of said adjacent holder as said inner holder is rotated by said shaft, and a second integral web radially projecting from the opposite edge of said hub having openings therein adapted removably to secure thereto a second soil working tine to extend tangentially in a direction substantially diametrically opposite said first tine.

6. An intermediate floating tine holder for a rotary soil-working tine holder assembly adapted to be connected between and held only by a tine holder disposed at opposite ends thereof on a rotary soil-working machine, comprising a hub; a single, integral, radially projecting web, intermediate the ends of said hub, whose outer edge is completely spaced from the outer surface of said hub; a single socket peripherally extending along the edge of said web and having an opening therein disposed transversely of the axis of rotation of said holder and adapted removably to secure thereto a curved resilient soil-working tine; a single adjacently disposed lug, terminating in arcuate alignment with the outer end of said web, against which an intermediate curved portion of said resilient tine is fulcrumed and flexed; and a plurality of spaced, angular, blunt projections horizontally extending around both peripheral edges of said hub, which projections are adapted interfittingly and interlockingly to engage similar projections of said oppositely disposed tine holders and be held in mounted, floating, rotatable position only by said oppositely disposed tine holders and means adapted to pass through said floating holder but out of contact therewith.

7. An outer tine holder for a rotary soil-working tine holder assembly adapted cooperatively to be connected to an intermediate tine holder only and remotely mounted away from but cooperatively associated with a stub drive shaft of a rotary soil-working machine, comprising a hub; a single, integral, radially projecting web, intermediate the ends of said hub, whose outer edge is completely spaced from the outer surface of said hub; a single socket peripherally extending along the edge of said web and having an opening therein disposed transversely of the axis of rotation of said holder and adapted removably to secure thereto a curved resilient soil-working tine; a single adjacently disposed abutment, terminating in arcuate alignment with the outer end of said web, against which an intermediate curved portion of said resilient tine is fulcrumed and flexed; a plurality of spaced, angular, blunt projections horizontally extending around the inner peripheral edge only of said hub, which projections are adapted interfittingly and interlockingly to engage similar projections of said intermediate tine holder; and a socket in the other end of said hub, having an opening therein, adapted to receive a bolt connectable to said stub shaft and to secure said holder in driving engagement with said intermediate tine holder.

References Cited in the file of this patent

UNITED STATES PATENTS

| Number | Name | Date |
|---|---|---|
| 1,266,328 | Schulte | May 14, 1918 |
| 1,416,906 | Strom et al. | May 23, 1922 |
| 1,562,731 | Arnold | Nov. 24, 1925 |
| 2,366,625 | Kelsey | Jan. 2, 1945 |
| 2,438,189 | Seaman | Mar. 23, 1948 |
| 2,501,364 | Traver | Mar. 21, 1950 |
| 2,539,053 | Blackledge | Jan. 23, 1951 |

FOREIGN PATENTS

| Number | Country | Date |
|---|---|---|
| 402,031 | Germany | Sept. 12, 1924 |
| 354,567 | Great Britain | Aug. 13, 1931 |